March 2, 1971      H. H. WELCH      3,567,393
AUTOMATIC APPARATUS FOR THE DETERMINATION OF FLUIDS AND IN
PARTICULAR BIOLOGICAL FLUIDS
Filed Jan. 24, 1968      6 Sheets-Sheet 6

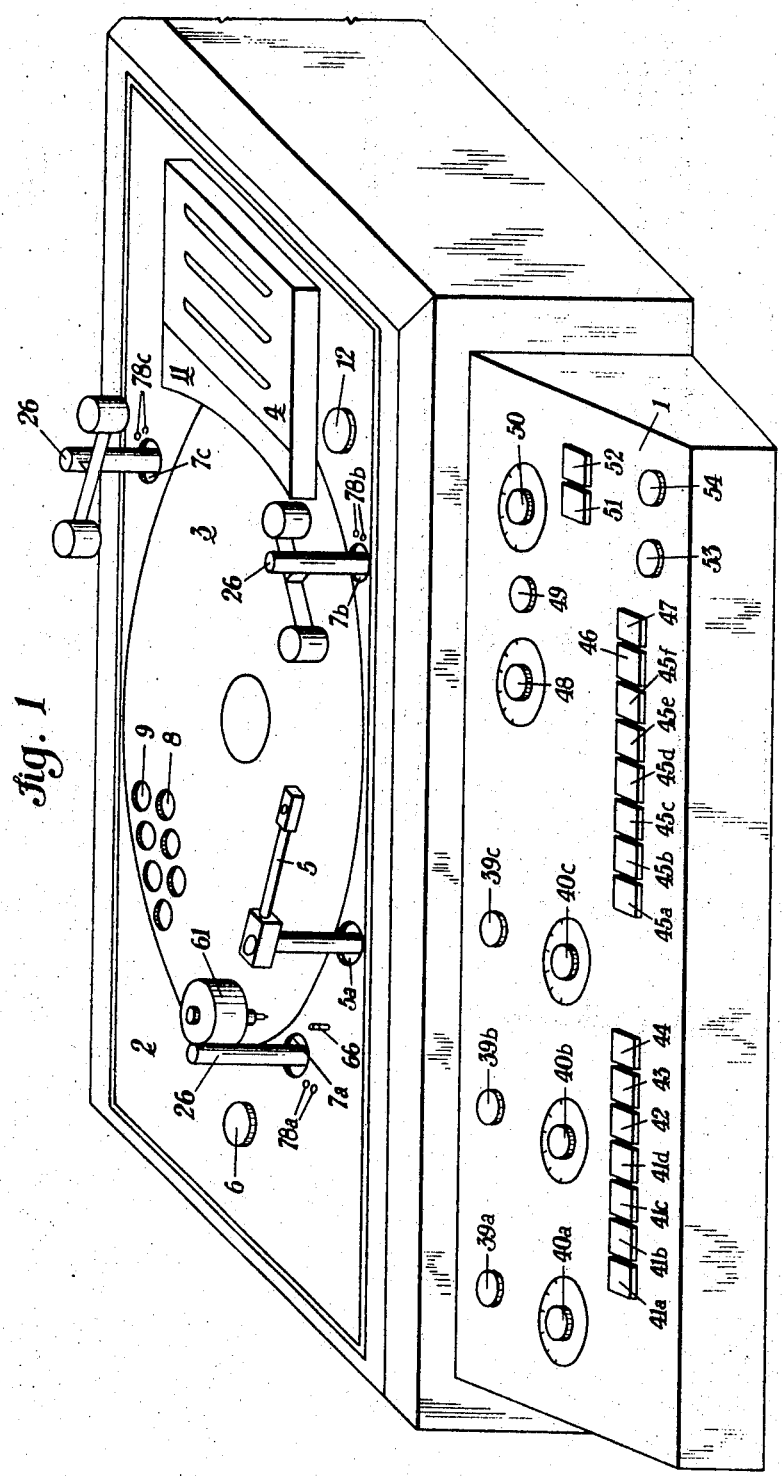

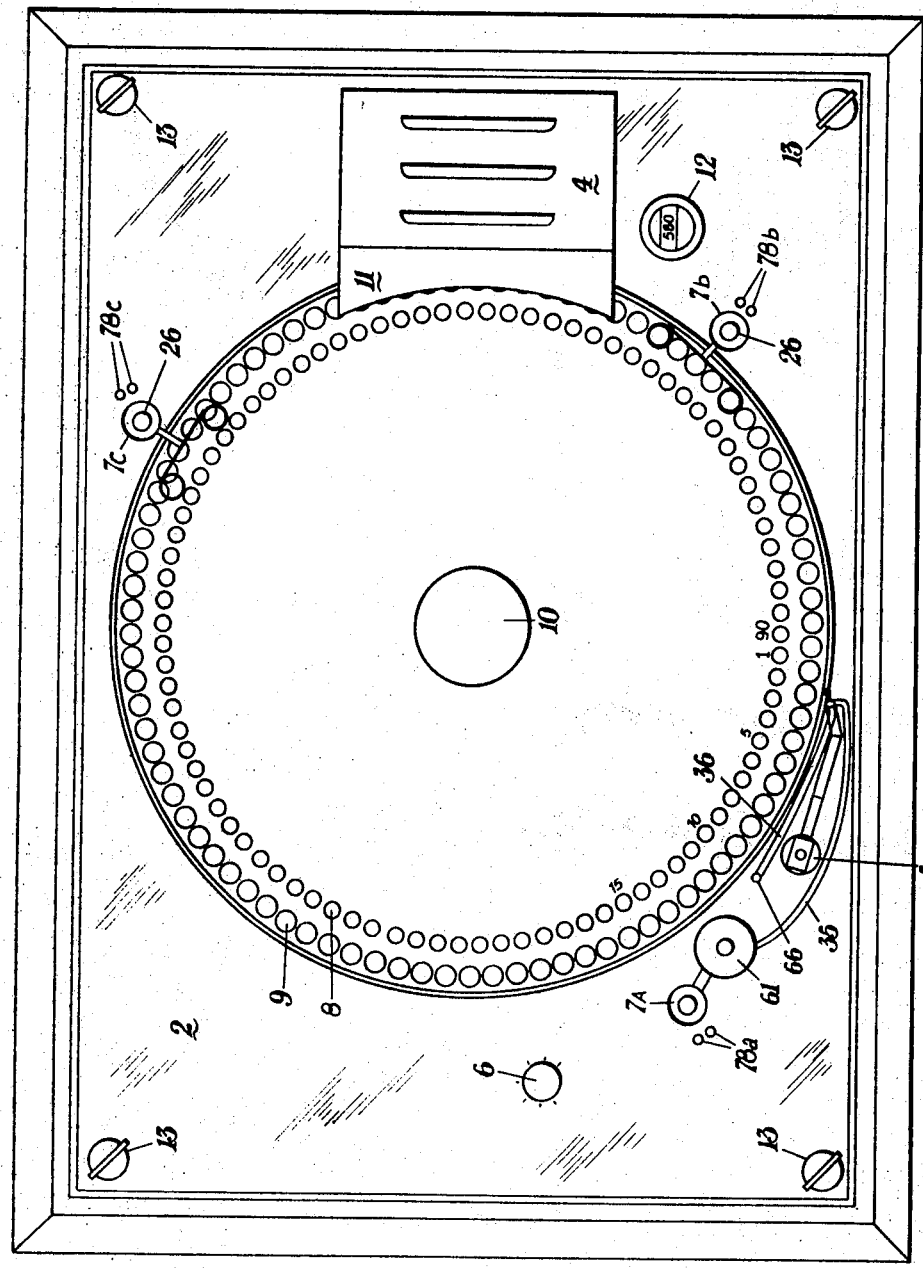

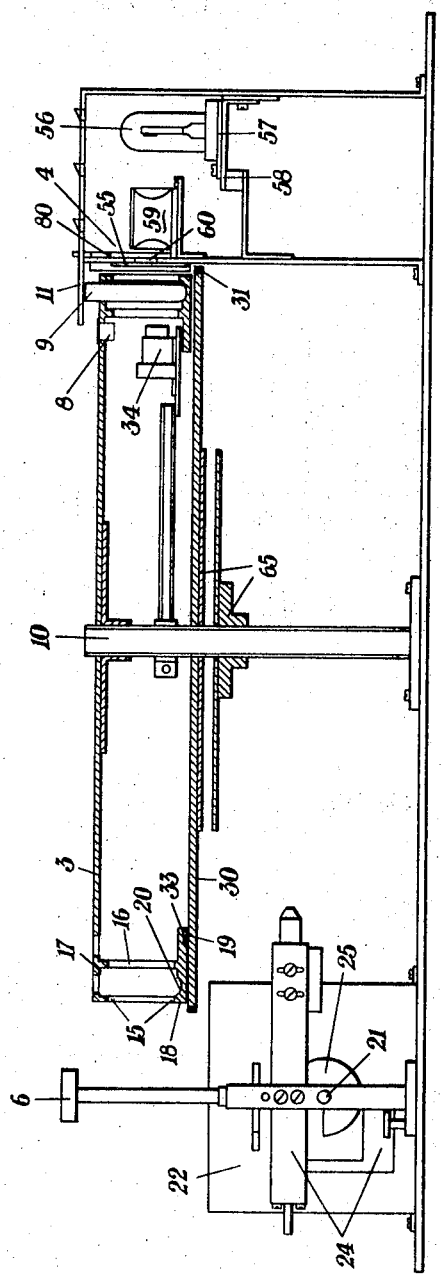

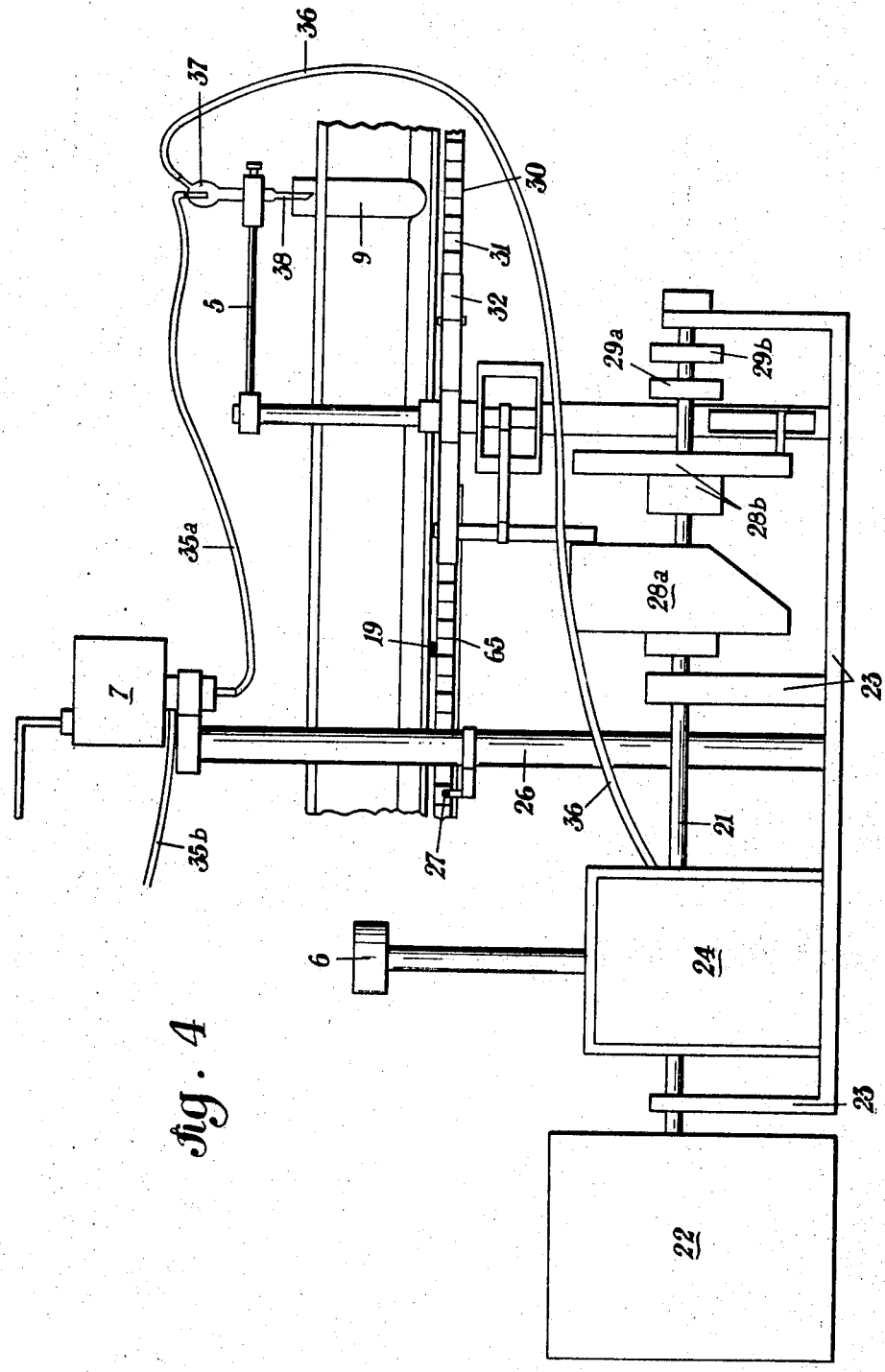

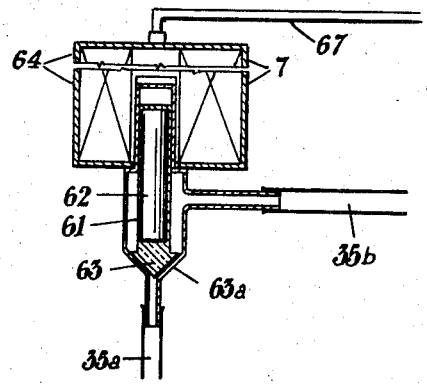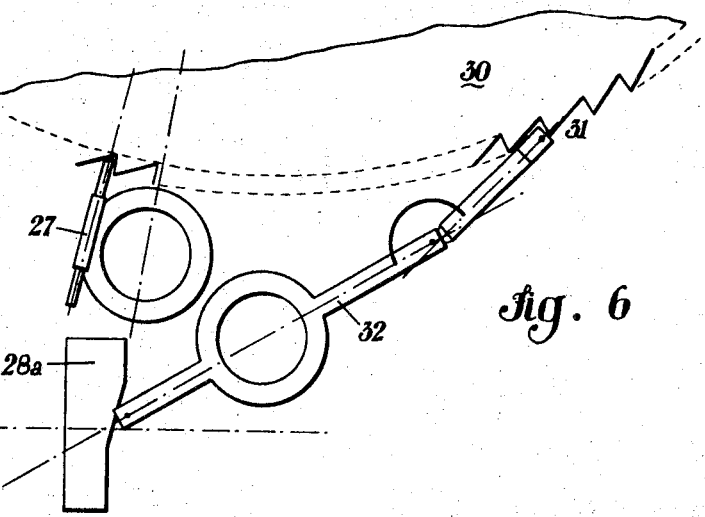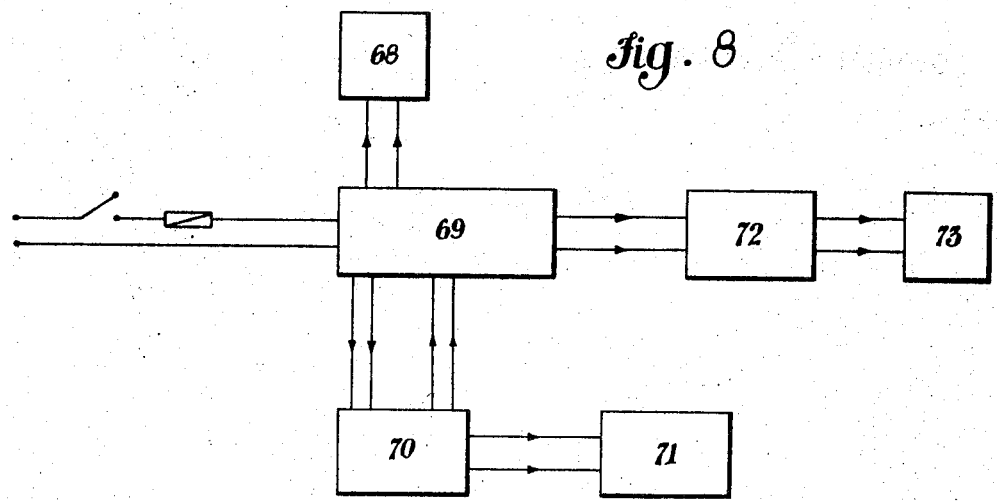

INVENTOR
HENRY HUGH WELCH

ATTORNEYS

United States Patent Office
3,567,393
Patented Mar. 2, 1971

3,567,393
AUTOMATIC APPARATUS FOR THE DETERMINATION OF FLUIDS AND IN PARTICULAR BIOLOGICAL FLUIDS
Henry H. Welch, Rome, Italy, assignor to
Poli-Mak S.r.l., Rome, Italy
Filed Jan. 24, 1968, Ser. No. 700,271
Claims priority, application Italy, July 3, 1967, 37,903/67
Int. Cl. G01n 31/00, 33/16
U.S. Cl. 23—253                                6 Claims

ABSTRACT OF THE DISCLOSURE

An automatic apparatus for the quantitative determination of fluids having a single motor. Electromagnetic valves control the quantitative addition of reagents. Means are provided for compensation and fine sensitivity control adjustments. An aspiration pump supplies the intermediate aspiration of variable amounts of sample and air by means of interchangeable cams. A single analytical plate is provided for containing the sample cups and the precalibrated reaction-measuring test tubes wherein the complete reaction and the colorimetric measurement is accomplished. The reagent additions is accomplished by gravity controlled by the electromagnetic valves. A transistorized power supply is provided for the colorimetric system which is stabilized for current variations. A power supply is provided for auxiliary circuits independent from the power supply of the colorimetric system and electronic means programming automatically a plurality of specimens.

The present invention relates to an automatic apparatus for analyzing fluids, and particularly biological fluids; more specifically the invention relates to an apparatus which permits automatically to analyze with utmost speed and accuracy groups of samples of fluid constituents in very large number of individual specimens.

The determinations of the analytical results are obtained by means of conventional and classical colorimetric methods normally processed manually on fluids mentioned above.

With the ever increasing demand for daily analytical data both in the industrial and more specifically in the clinical and research fields automation has become a necessity. In such cases manual processing of specimens could not cope with the quantity, precision and accuracy of the analyses required.

The main scope of the present invention is to provide an apparatus which automatically will process large numbers of samples with utmost speed and accuracy, which would be unthinkable if not impossible to do manually.

For this purpose, the apparatus according to the invention not only automates the step by step manual procedure found in analytical chemistry, but also introduces special features of simplicity enabling an unskilled technician to use the apparatus without difficulty.

As a result there is a great advantage in saving time, cost and labor and furthermore a great increase of work capacity. The output both qualitative and quantitative is far superior to manual techniques, since it eliminates the inherent human error present in manual operation.

Another object of the invention is to provide an apparatus for automatic determination of fluids where each sample is processed individually in its proper reaction-measuring test tube, each sample is also measured in the colorimeter in the same test tube, eliminating thereby transfers and contamination, and assuring proper identification of each individual specimen.

A further object of the invention is to provide an automatic apparatus suitable for colorimetric measurements (kinetic studies).

Furthermore in case of doubtful results or errors, the apparatus according to the inventions permits to repeat an indefinite number of times the sample measurement in the colorimeter.

Another subject of the invention comprises the use of a continuous interference filter device which permits to select any desired wavelength in the range from 400 to 700 millimicrons in the colorimeter for sample measurement.

Still another object of the invention is to permit besides the completely automatic operation, the possibility of executing each or all individual steps separately by operating the apparatus on a manual switch.

Finally, another object of the invention is to use the apparatus as an automatic colorimeter only for the measurement and recording of the data obtained.

Another object of the invention is to utilize extremely small amounts of samples and reagents in corresponding amounts and concentrations.

Finally, an object of the inventions comprises the use of the apparatus as an automatic dispenser, sampler and also as a fraction collector.

According to the present invention a wholly self-contained and automatically timed apparatus is provided for the quantitative determination of fluids, suitable to process in an orderly sequence the steps of drawing an exactly metered amount of sample to be analyzed, transferring said sample into a reaction measuring cuvette, adding the required amounts of reagent or reagents, mixing said sample and said reagent or reagents, allowing said mixture to incubate in said cuvette for a time required for the reaction of the sample and reagent or reagents to take place, measure in a continuous interference filter colorimeter and finally to record graphically the results of the colorimetric measurements on a moving chart recorder assisted by compensation and fine sensitivity adjustment systems built in the apparatus.

The automatic performance of all the operations in the apparatus and the conditions required for each individual case, is provided through the use of a technologically suitable electronic programmer selector device.

The simplicity, accuracy, speed and reliability features of the apparatus according to the invention are obtained by the use of the following technical approaches:

use of a single electric motor driving all the mechanisms;
use of electromagnetic valves for the quantitative additions of reagent or reagents;
built-in devices for compensation and fine sensitivity adjustment controls;
using an aspiration pump for the intermittent aspiration of variable amounts of samples to be analyzed and air, said aspiration being accomplished by means of interchangeable cams;
use of a single analytical plate containing the sample cups and the pre-calibrated reaction-measuring cuvettes, technologically suitable to enable both the complete reaction and the colorimetric measurement to be done in the same test tube without the necessity of transfers;
using reagent or reagents addition by gravity whose exact quantities are controlled by the time of opening and closing of the electromagnetic valve or valves;
use of a push-button system for the manual energization at any time of the electromagnetic valves, the monitoring of said valves and the control of the amounts of reagent or reagents delivered;
use of a transistorized power supply for the colorimetric system stabilized with respect to current variations and protected against short-circuits;

use of a power supply for the auxiliary circuits (motor, electromagnetic valves, etc.) independent from the power supply of the colorimetric system.

The following invention will now be described with reference to the attached drawings which show by way of example and by no means of limitation a preferred embodiment of the invention.

In the drawings:

FIG. 1 shows a perspective view of the invention;

FIG. 2 shows a plan view of the outer top portion of said apparatus;

FIG. 3 shows a sectional view of the apparatus of FIG. 1 along the longitudinal axis;

FIG. 4 shows a sectional view of the apparatus of FIG. 1, along the transversal axis;

FIG. 5 is a sectional view of the reagent feed electromagnetic valve;

FIG. 6 is a plan view of the driving mechanism of the base plate and the locking system;

FIG. 8 is a block diagram of the power supply circuit of the programmer and the colorimetric system.

Figure 7:
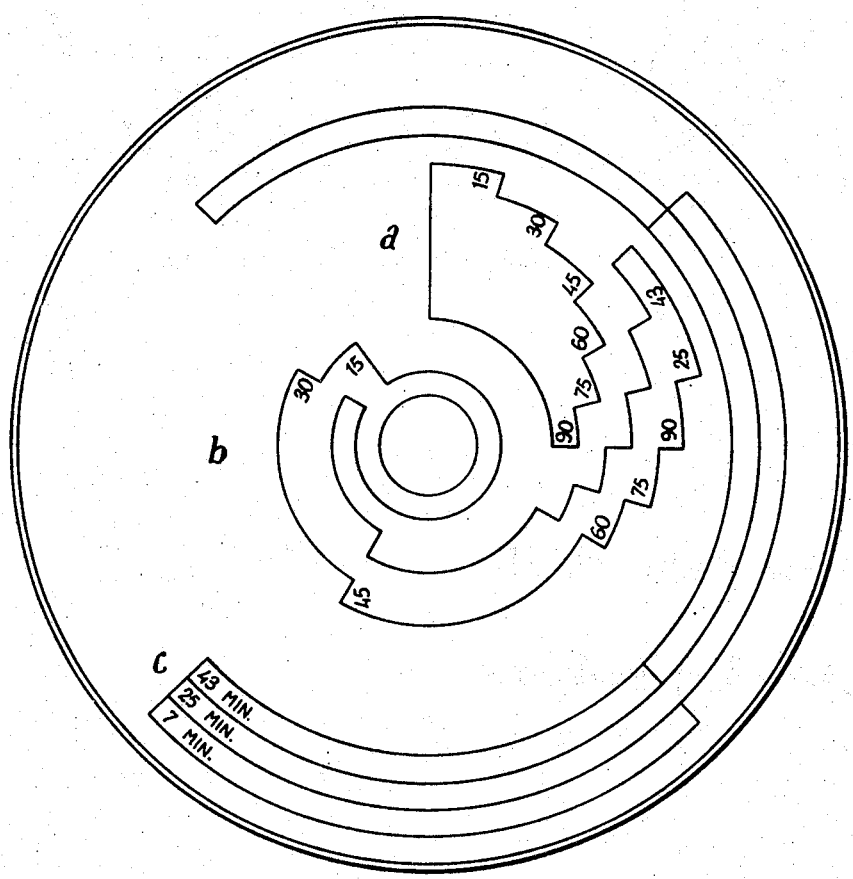
FIG. 7 is a plan view of the selector programmer.

Referring now particularly to FIG. 1 of the drawings wherein with the reference numeral 1 the control panel of the apparatus according to the invention is denoted on which are displayed all the controls for selecting and programming the desired conditions required to perform an analysis.

The top portion of the apparatus is closed by means of the cover 2. On said cover 2 are visible five electromagnetic valves 61 divided in groups and mounted on supports 26 housed in the holes 7a, 7b and 7c arranged along the peripheral circumference of the central circular recess housing an analytical plate 3 revolving about a supporting central axis 10. In the proximity of said holes 7a, 7b and 7c the plugs 78a, 78b and 78c are provided for the electric connections of the abovementioned electromagnetic valves. On said cover are also visible the protective cover 11 of the colorimeter 4 and a wavelength adjusting knob 12. In a diametrically opposed position with respect to the colorimeter 4 a control knob 6 is provided to select the proper quantity of sample to be aspirated by the pump. Finally, a sampling arm 5 is housed in the recess 5a of said cover. On the analytical plate 3 there are two concentric rows of equally spaced holes.

The inner row of holes is used for holding ninety sample cups 8 made of plastic material in which the fluids to be analysed are introduced. The outer row of holes is used for holding the precalibrated reaction measuring test tubes 9, in number identical to the previous ones.

The control panel 1 has at the top portion the controls 39a, 39b, and 39c for the manual jet dispenser of reagent or reagents, respectively, by means of the electromagnetic valves 7 housed in 7a, 7b and 7c; the quantitative delivery of the reagent into the test tubes by means of said valves is controlled with knobs 40a, 40b and 40c; the knob 48 is for compensation control (scale multiplier), the switch 49 for the "automatic" or "manual" recording of the results of the colorimetric measurement, the sensitivity control knob 50, the energizing push-button 51 of the starting control and the energizing pushbutton 52 of the stop control.

At the bottom portion of the control panel 1 is displayed a control keyboard divided in two sections. The first contains the energizing push-buttons (41a, 41b, 41c and 41d) of the valves housed respectively in the recesses 7a, 7b and 7c, the pump energizing pushbutton 42, the manual operation energizing push-button 43 and the automatic operation energizing push-button 44; while the second section of the keyboard (on the right side of the panel in the embodiment of the invention) includes the pushbuttons 45a, 45b, 45c, 45d, 45e and 45f respectively controlling automatically the processing of 15, 30, 45, 60, 75 and 90 samples, the push-button 46 sets incubation time of 25 minutes and pushbutton 47 sets an incubation time of 43 minutes, before colorimetric measurement.

Finally the board includes a signal light 53 and a master switch 54. With particular reference to FIG. 2 of the drawings, the cover 2 of the apparatus according to the invention is fastened to said apparatus by means of 4 screws 13. On the analytic plate 3, revolving about the supporting central axis 10 are visible in their whole development two concentric rows of 90 holes each, designed to accommodate in the inner row, the sample cups 8 and in the outer row the precalibrated reaction-measuring test tubes 9. On said covr 2 is visible the colorimeter cover 11 of the colorimeter 4, the knob 12 for adjusting the wavelength and in a diametrically opposed position, the control knob 6 for sample aspiration of the aspiration pump. The electric magnetic valves 61 placed on supports 26 are respectively housed in the circular recesses 7a, 7b and 7c, while the electric connections of said valves are plugged in by means of plugs 78a, 78b and 78c. The sampling arm 5 is housed in the recess 5a and is fed by the valve 61 (position 7a), through the connecting tube 35, while the sample to be analyzed is aspirated through tube 36 which connects the pump to a sampling distributor device made of glass or Teflon fitted on said sampling arm.

Reference is now made to FIG. 3 in which is illustrated in detail the insides of the apparatus and in particular the analytical plate 3. Said plate 3 has near its periphery two concentric rows of equally spaced holes, ninety in number for each row. The holes of the inner row hold the cups 8 of plastic material containing the sample to be analyzed, while the precalibrated reaction measuring test tubes 9 of neutral glass of good optical characteristics are held in the holes of the outer row. On the inside of the casing of the apparatus are visible the analytical plate 3 of metal painted completely black in order to avoid light reflections during the measurement in the colorimeter 4 and shielded by cover 11 and an aspiration piston pump 24 for the aspiration of the sample to be analyzed.

The analytical plate 3 is supported by means of supporting columns 16 to its base 18. The said plate 3 provides housings 20 for the reaction measuring test tubes 9 and in addition there is a locking opening 19 into which a locking pin 33 fits from the base platter 30. When the analytic plate 3 is placed on said base platter 30, and the locking opening 19 fits the respective pin 33 of the base platter 30, all movements of the apparatus are synchronized and controlled by the electronic device according to the invention wherein the programmer-selector is denoted by the reference numeral 65, the said programmer being placed below the base platter 30 and stationary with respect thereto.

The colorimeter 4 includes a wolfram filament lamp 56 fitted on a support fastened to a base 58 movable both horizontally and vertically, a lens 59 (provided with diaphragms 80) transmits the light to the reaction-measuring test tubes 9 across a continuous interference filter 55, a passage opening 60 formed on the side wall of the colorimeter 4 and an opening 15 provided on the whole lateral surface of the analytical plate 3 to be finally absorbed by a selenium cell 34 which in its turn transmits the impulse to a technologically suitable recording system.

The aspiration pump 24, whose aspiration is controlled by the knob 6 has the piston stroke controlled by a set of cams 25. One of said cams 25 controls the piston total stroke while the other ones are interchangeable cams having different diameters for the aspiration of different amounts of sample. A cycle of the pump corresponds to a complete revolution (360°) of the drive shaft 21 and to the complete processing of a sample. Said pump and shaft 21 are driven by an electric motor not shown in figure.

Reference is now made to FIG. 4 of the drawings illustrating specifically the mechanical portion of the apparatus. The aspiration pump 24 aspirates the sample to be analyzed, the quantity of which can be controlled by means of the knob 6, is driven by the electric motor 22 through the drive shaft 21 on which are mounted the cams which control all the mechanical movements in the apparatus; in particular the cam 28a which controls the arm 32 which moves the base platter 30 and the analytical plate 3 mounted on the latter and which in addition controls the horizontal movement of the sampling arm 5; the cam 28b which controls the vertical movement of the sampling arm 5, and finally the cams 29a and 29b which respectively control the opening of the electromagnetic valve 7 and the energization of the colorimeter 4 by means of two microswitches not shown in figure.

The base platter 30 is circular in shape and moves about the supporting axis 26, and has on its periphery 90 equally spaced teeth 31. Each tooth 31 corresponds to a plastic sample cup and a reaction-measuring glass test tube. The teeth 31 of the base platter 30 provided for the movement of the base platter by means of the moving arm 32 which moves said base platter 30 to advance by a tooth for each 360° revolution of the drive shaft 21; it assures also conjointly by means of the blocking pin 27 and the locking pin 19 the synchronized movement of the analytical plate and the locking of said base platter 30 in the rest periods.

The advancement of the base platter 30 by one tooth 31 moves the analytical plate by one space, introducing that way a new sample under the sampling arm 5 to be processed and at the same time introducing into the colorimeter the subsequent reaction measuring test tube for the colorimetric measurement.

The drive shaft 21 is mounted on three supports 23 and on said shaft are fitted the above described aspiration pump unit 24, the cams 28 and the cams 29.

The electromagnetic valve shown at 7 delivers the reagent through the tube 35b and feeds through the tube 35a the distributor sampling device 37 made of glass or Teflon fitted on said sampling arm 5.

The said distributor 37 is connected also to the sample aspirating pump 24. Said device 37 terminates then in a single dispenser 38 which is introduced subsequently by the sampling arm 5 first in the sample cup 8 and then in the reaction measuring test tube during a complete revolution of the drive shaft 21.

Reference is now made to FIG. 5 of the drawings wherein is illustrated in detail the electromagnetic valve 7 for dispensing quantitative amounts of reagent to be introduced into the reaction measuring test tubes. Said valve 7 comprises a metal plunger 62 covered by a glass or plastic casing envelope 61, the tapered lower end 63 fits snugly into a suitable precalibrated tapered opening 63a. On the outer casing 61 of the valve is provided an electromagnet, which, when energized, lifts the plunger 62 from the conical seat 63a in which it is housed.

With the reference numeral 35a is then denoted the tubing which carries the reagent from the valve to the sampling distributor device or directly in the reaction-measuring test tubes. The supply tube of the reagent to the valve is shown in 35b and with the reference numeral 67 is denoted the electrical wire for the magnet 64 activation.

FIG. 6 shows in detail a plan view of the drive mechanism of the base platter 30 and the lock system. The cam 28a controlling the sampling arm is connected by means of the driving arm 32 to said base platter and causes the advancement thereof by a space of a tooth 31, for each complete revolution (360°) of the drive shaft (not shown in figure), the locking of said base platter 30 during the rest periods is being assured by the blocking pin 27.

Particular reference is now made to FIG. 7 of the drawings wherein the programmer-selector device according to the invention is shown comprising a disk on which are gold printed contact patterns divided into groups, these when energized by a sliding contact will program the basic steps necessary to perform an analysis.

In said figure is visible the group A of contacts which control the programming for the processing of a group of 15, 30, 45, 60, 75 and 90 samples at a time; the group B of contacts which causes the automatic stop of the apparatus after the colorimetric measurement of the aforesaid groups of samples and moreover the timing of a single turn (25 minutes) or two turns (43 minutes) of the analytical plate or a fraction of a turn of said plate equal to 7 minutes to bring the reaction measuring test tubes from the sampling point to the colorimeter.

The energization of any such individual turns takes place through the group of contacts C divided into three strips respectively for a revolution of 7, 25 and 43 minutes.

With particular reference to FIG. 8 of the drawings which shows diagrammatically the power supply and the block electrical circuit of the devices according to the invention, connected to provide an automatic operation, the main power supply device is shown at 70. Said power supply 70 is connected in a first circuit to the unit comprising the programmer 69, motor 68, reagent distributors 72 and the electromagnetic valves 73.

A separate circuit energizes the colorimeter 71, the operation of which is thus independent from the group of the other devices of the apparatus and thoroughly stabilized by means of transistors against voltage changes in the main system and the thermal drift of the base line.

On completion of what hereabove is set forth and illustrated in the drawings showing the apparatus according to the invention in its whole and in its parts, it should also be noted that the operation of said apparatus can be wholly automatic or semiautomatic. In the first case the push-button 44 is energized for "automatic" operation on the control panel and all the operations programmed before starting the analysis by means of the suitable control keys are executed automatically and synchronized with the programmer and the rest of the system.

In the second case a push-button 43 of energization for "manual" operation is pressed and all the operations take place "manually," that is, each single operation will start when the corresponding control will be energized and will stop when said control will be de-energized.

The present invention has been described with reference to a presently preferred embodiment thereof, but it will be understood that changes and modifications can be made therein without departing from the scope of the invention.

Having thus described the invention I claim:

1. An automatic apparatus for automatically analyzing fluids, in particular biological fluids, comprising in combination support means, a vertical shaft arranged on said support means, a drive motor supported by said support means, a horizontal shaft operatively coupled to said drive motor and supported by said support means, a first cam means mounted on said horizontal shaft, an aspiration pump operatively coupled to said first cam means, a control knob for controlling the aspiration volume of said pump, a toothed base platter mounted on said vertical shaft, a second cam means mounted on said horizontal shaft, a moving arm operatively coupled at its one end to said second cam and at its other end to said toothed base platter to cause the rotation thereof, an analytical plate arranged on said base plate and having two concentric rows of outer and inner equispaced holes, a plurality of sample plastic cuvettes inserted in said inner holes, a plurality of test glass cuvettes inserted in said outer holes, a sampling arm operatively coupled to said second cam means to perform horizontal movements, a dispenser container fastened to said sampling arm, a third cam means mounted on said horizontal shaft and operatively coupled to said sampling arm to perform vertical movements thereof, a fourth cam means mounted on said horizontal shaft, a plurality of reagent supplying electromagnetic valve means arranged around said analytical plate and controlled by said fourth cam means, a fifth cam means mounted on said horizontal shaft, colorimeter means operated by said fifth cam means and arranged outside of said base platter and programmer-selector means for programming and selecting the operation of the apparatus.

2. An automatic apparatus as claimed in claim 1, wherein said first cam means comprises a first cam controlling the total stroke of said aspiration pump and a plurality of interchangeable cams having different diameters for causing by means of said control knob said aspiration pump to aspirate different amounts of sample to be analyzed.

3. An automatic apparatus as claimed in claim 1, wherein said toothed base platter has on its periphery equispaced teeth, each tooth corresponding to one sample cuvette, said moving arm causing said base platter to advance by a tooth for each whole revolution of said horizontal shaft.

4. An automatic apparatus as claimed in claim 1, wherein each of said electromagnetic valves is connected by a flexible tube with said dispenser container to introduce a reagent therein, said dispenser container being connected by a flexible tube with said aspiration pump.

5. An automatic apparatus as claimed in claim 1, wherein said programmer-selector means comprises a circular disc arranged underneath the base platter and stationary with respect thereto and carries printed circuits subdivided in a first circuit group controlling the processing of a variable number of the sample cuvettes, a second circuit group for automatic stopping of the apparatus after the measurement by said colorimeter means of the selected number of sample cuvettes and a third circuit group for selecting the processing time of said number of sample cuvettes.

6. An automatic apparatus as claimed in claim 1, wherein said colorimeter means comprises a wolfram filament lamp, a lens arranged between said lamp and said test glass cuvettes and a selenium cell placed between said base platter and said analytical plate and transmitting impulses to a recording means.

References Cited
UNITED STATES PATENTS

| | | | |
|---|---|---|---|
| 2,950,177 | 8/1960 | Brown et al. | 23—253 |
| 3,019,091 | 1/1962 | Schneider, Jr. | 23—253 |
| 3,178,266 | 4/1965 | Anthon | 23—253 |
| 3,192,968 | 7/1965 | Baruch et al. | 23—259X |
| 3,193,358 | 7/1965 | Baruch | 23—253 |
| 3,197,285 | 7/1965 | Rosen | 23—253 |
| 3,322,958 | 5/1967 | Heiss | 23—253UX |
| 3,437,447 | 4/1969 | Harmon | 23—253 |
| 3,449,959 | 6/1969 | Grimshaw | 73—423 |

JOSEPH SCOVRONEK, Primary Examiner

U.S. Cl. X.R.

23—259; 356—39, 186